United States Patent
Yen

(10) Patent No.: US 10,394,742 B2
(45) Date of Patent: Aug. 27, 2019

(54) METHOD FOR DETERMINING A TYPE OF A DEVICE CONNECTED TO AN INTER-INTEGRATED CIRCUIT ($I^2C$)

(71) Applicant: MITAC COMPUTING TECHNOLOGY CORPORATION, Taoyuan (TW)

(72) Inventor: Chi-Yuan Yen, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 9 days.

(21) Appl. No.: 15/676,272

(22) Filed: Aug. 14, 2017

(65) Prior Publication Data

US 2018/0052794 A1    Feb. 22, 2018

(30) Foreign Application Priority Data

Aug. 19, 2016 (TW) .............................. 105126502 A

(51) Int. Cl.
*G06F 13/40* (2006.01)
*G06F 13/42* (2006.01)

(52) U.S. Cl.
CPC ...... *G06F 13/4027* (2013.01); *G06F 13/4282* (2013.01)

(58) Field of Classification Search
CPC .......................... G06F 13/4027; G06F 13/4282
See application file for complete search history.

(56) References Cited

U.S. PATENT DOCUMENTS

| | | | |
|---|---|---|---|
| 7,552,275 B1 * | 6/2009 | Krishnan | ......... G06F 17/30982 365/49.1 |
| 2006/0153122 A1 * | 7/2006 | Hinman | ................ H04L 63/10 370/328 |

OTHER PUBLICATIONS

Intelligent Platform Management Interface Specification Second Generation v2.0; p. 1, 2, and 549-551. Document Revision 1.1, Oct. 1, 2013 (Year: 2013).*

* cited by examiner

*Primary Examiner* — Eric T Oberly
(74) *Attorney, Agent, or Firm* — Michael Best & Friedrich LLP

(57) ABSTRACT

A method for determining a type of a device connected to an inter-integrated circuit ($I^2C$) includes steps of: a) transmitting requests to bus addresses of the $I^2C$, respectively; b) upon receipt of a response message transmitted by a device in response to receipt of one of the requests from one of the bus addresses, determining that the device is connected to said one of the bus addresses; and c) according to a lookup table that includes plural of entries, each of which has a corresponding device type and respective address set consisting of at least one reference address conforming with one of the bus addresses, determining a type of the device as one of the device types in the lookup table with reference to said one of the bus addresses.

12 Claims, 4 Drawing Sheets

METHOD FOR DETERMINING A TYPE OF A DEVICE CONNECTED TO AN INTER-INTEGRATED CIRCUIT (I²C)

CROSS-REFERENCE TO RELATED APPLICATION

This application claims priority to Taiwanese Patent Application No. 105126502 filed on Aug. 19, 2016.

FIELD

The disclosure relates to a method for determining a type of a device connected to an inter-integrated circuit (I²C).

BACKGROUND

An inter-integrated circuit (I²C) includes serial buses, usually a Serial Data Line (SDA) and a Serial Clock Line (SCL), for transmitting data. Various devices such as modular circuits are connected in parallel to the serial bus and each of the devices corresponds to at least one particular address via which data communication from and to the I²C is performed. Generally, a circuit diagram that indicates what devices are connected respectively to the serial bus addresses of the I²C is required in order to obtain information relating to a type of each of the devices. Taking a circuit diagram that indicates that the bus address of "0x01, 0xa0" of the I²C (i.e., the address "0xa0" of a bus 1 of the I²C) is connected with an electrically erasable programmable read only memory (EEPROM) as an example, to verify if the bus address of "0x01, 0xa0" of the I²C is indeed connected with the EEPROM, a processor is employed to transmit an intelligent platform management interface (IPMI) command (e.g., "0x06 0x52 0x01 0xa0 0x01 0x00") to the bus address of the I²C. The IPMI command includes a type of a read/write command (e.g., "0x06, 0x52"), one of the bus addresses (e.g., "0x01, 0xa0") which receives the request, a feedback request (e.g., "0x01"), and an instruction set (e.g., "0x00") for the device connected to the one of the bus addresses. When a response message from the bus address of "0x01, 0xa0" is received by the processor, it is determined that the EEPROM is connected at said bus address. Otherwise, it is determined that said bus address is not connected with the EEPROM.

However, it is necessary to refer to the circuit diagram to obtain the type of the device corresponding to any particular bus address or to determine a particular bus address (i.e., a slave address) corresponding to an I²C device to which a request is to be transmitted before transmitting the request to the particular bus address of the I²C. Additionally, it is also required to understand an instruction set for the type of the device connected to the particular bus address of the I²C in advance of transmitting an IPMI command to said device. Further, the abovementioned procedure merely verifies that a bus address which is indicated to be connected with a particular device is indeed connected with the particular type of device, and cannot verify if a bus address which is indicated as not being connected with any device is actually not connected with any device.

SUMMARY

Therefore, an object of the present disclosure is to provide a method for determining a type of a device connected to an inter-integrated circuit (I²C) without using a circuit diagram that indicates connection state of bus addresses of the I²C.

According to one aspect of the present disclosure, the method to be implemented by a processor electrically connected to the I²C and includes steps of:

a) transmitting a plurality of requests to a plurality of bus addresses of the I²C, respectively; and b) upon receipt of a response message from one of the bus addresses of the I²C, determining that at least one device is currently connected to said one of the bus addresses, the response message being transmitted by the at least one device in response to receiving one of the requests from said one of the bus addresses to which the at least one device is connected; and c) according to a lookup table that includes a plurality of device types respectively corresponding to a plurality of address sets each consisting of at least one reference address conforming with one of the bus addresses of the I²C, determining a type of the at least one device as one of the device types in the lookup table with reference to said one of the bus addresses.

BRIEF DESCRIPTION OF THE DRAWINGS

Other features and advantages of the present disclosure will become apparent in the following detailed description of the embodiment with reference to the accompanying drawings, of which.

DETAILED DESCRIPTION

Figure 1:
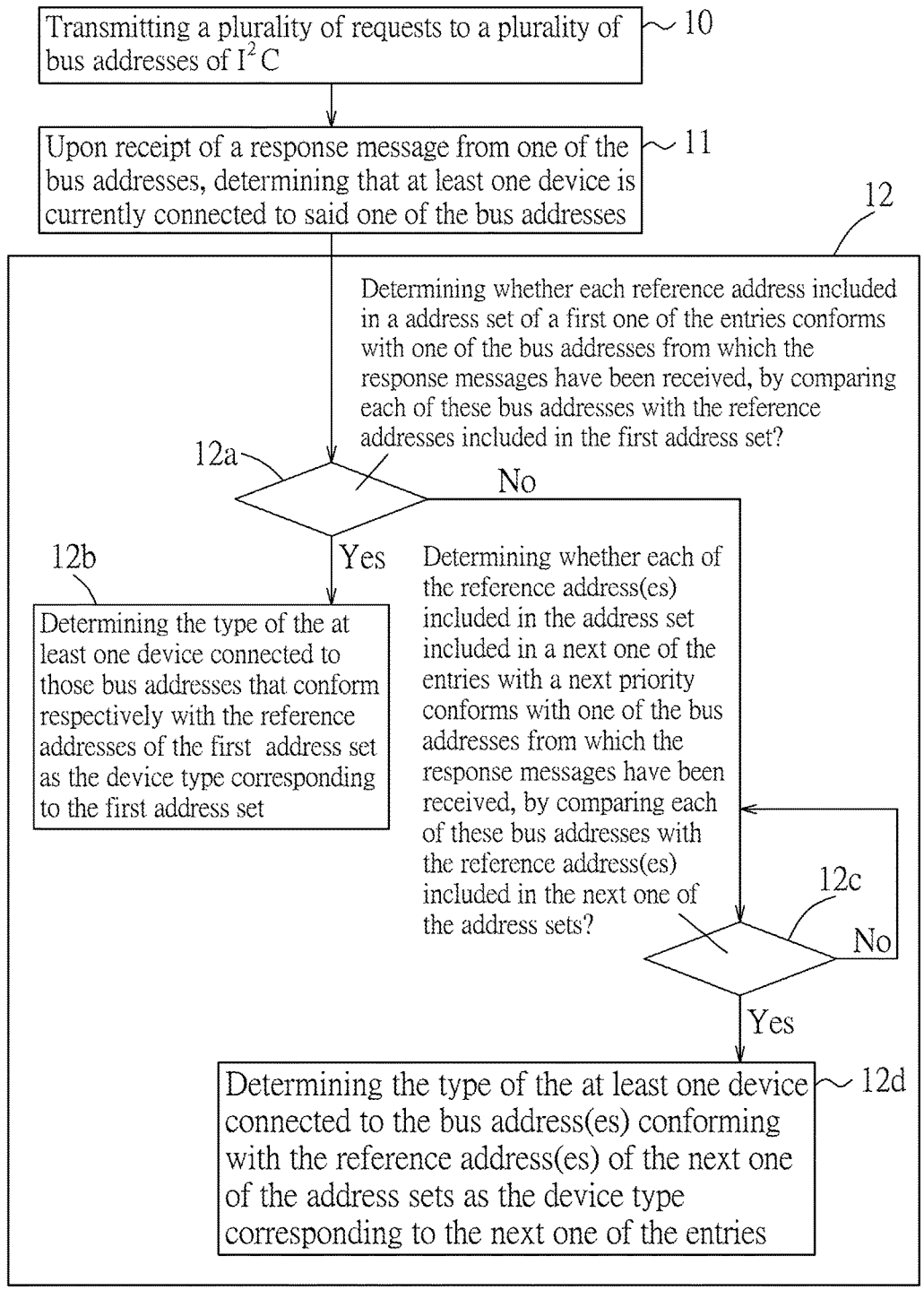
FIG. 1 is a flow chart illustrating a comparison procedure of the method for determining a type of a device connected to an inter-integrated circuit (I²C) according to an embodiment of the present disclosure.

Referring to FIG. 1, the method for determining a type of a device connected to an inter-integrated circuit (I²C) according to an embodiment of this disclosure is shown. The method is to be implemented by a processor (not shown) that is electrically connected to the I²C (not shown). The method includes a comparison procedure (e.g., steps 10 and 12) for determination of the type of the device and a verification procedure (e.g., steps 201 to 222 in FIGS. 2 to 4) for verifying if the type thus determined is correct. In step 10, the processor transmits a plurality of requests to a plurality of bus addresses of the I²C. In step 11, when a response message from one of the bus addresses of the I²C is received by the processor, the processor determines that at least one device is currently connected to said one of the bus addresses. Note that in this embodiment, the requests are transmitted to all of the bus addresses of the I²C, respectively. The at least one device transmits a response message via said one of the bus addresses to which the device is connected in response to receiving one of the requests from the bus address. For instance, when a single device is connected to multiple bus addresses of the I²C (e.g., due to multiple pin connections), multiple response messages may be transmitted by the device in response to receipt of multiple requests at the multiple bus addresses. In one embodiment, each of the response messages is 1 byte of data. The bus addresses may be all of the addresses of the I²C, i.e., bus addresses of "0x00" to "0xfe" of a bus 1 of the I²C. Note that in the following description, each of the bus addresses is connected to only one device.

In one embodiment, each of the requests includes an intelligent platform management interface (IPMI) command, e.g., "0x06 0x52 0x01 0xa0 0x01". The IPMI command of each of the requests includes a type of a read/write command (e.g., "0x06 0x52"), one of the bus addresses which receives the request (e.g., one of addresses of "0x01, 0x00" to "0x01, 0xfe"), and a feedback request (e.g., "0x01"). Each of the requests is to be transmitted to the one of the bus addresses included in the IPMI command of a corresponding one of the requests.

In one embodiment, the IPMI command does not include an instruction set for a device corresponding to the one of the bus addresses.

In step 12, according to a lookup table that includes a plurality of entries, each of which has a corresponding device type and a respective address set consisting of at least one reference address that conforms with one of the bus addresses of the I²C, the processor determines a type of the at least one device as the device type of one of the entries in the lookup table with reference to said one of the bus addresses. In one embodiment, the processor determines the type of the at least one device as the device type of one of the entries that includes the address set which consists only of the reference address conforming with said one of the addresses from which the response message is received.

In this embodiment, the lookup table includes a plurality of reference addresses conforming respectively with the bus addresses of the I²C, and the address set of each of the entries consists of at least one of the reference addresses. The device type of one of the entries corresponding to the address set that consists of a greater number of the reference addresses has a higher priority of consideration in the determination of the type of the at least one device.

In this embodiment, step 12 includes sub-steps of 12a to 12d which are explained hereinafter in an exemplified condition that a plurality of the response messages are received from respective ones of the bus addresses. In sub-step 12a, the processor determines whether each of the reference addresses included in the address set of a first one of the entries, the address set of which (hereinafter the first address set) consists of the greatest number of the reference addresses, conforms with one of the bus addresses from which the response messages have been received, by comparing each of these bus addresses with the reference addresses included in the first address set. In other words, the processor determines whether a match may be found in the bus addresses from which the response messages are received for every single one of the reference addresses included in the first address set. When the determination made in sub-step 12a is affirmative, a flow of the method goes to sub-step 12b; otherwise, the flow goes to sub-step 12c.

In sub-step 12b, the processor determines the type of the at least one device connected to those bus addresses that conform respectively with the reference addresses of the first address set as the device type corresponding to the first address set.

In sub-step 12c, the processor determines whether each of the reference address(es) included in the address set included in a next one of the entries with a next priority conforms with one of the bus addresses from which the response messages have been received, by comparing each of these bus addresses with the reference address(es) included in the next one of the address sets.

When the determination made in sub-step 12c is affirmative, sub-step 12d is performed, in which the processor determines the type of the at least one device connected to the bus address(es) conforming with the reference address(es) of the next one of the address sets as the device type corresponding to the next one of the entries (and thus the address set thereof). When the determination made in sub-step 12c is negative, the flow goes back to sub-step 12c, i.e., sub-step 12c is repeated.

It should be noted that sub-step 12c is repeated until a match is found in the bus addresses from which the response messages have been received for every single one of the reference addresses included in one of the address sets. It should be noted herein that step 12 should be repeated for any remaining bus address from which a response message has been received that is not included in the address set of which every single reference address was compared in any previous instance of sub-steps 12a or 12c, until another device type is determined. An example of the lookup table is shown below.

TABLE 1

| Address Set | Device Type |
| --- | --- |
| 0x36 0x66 0xa6 | Peripheral Component Interconnect Express Solid State Drive (PCIe SSD) |
| 0xa0 0xb0 | Power Supply Unit (PSU) |
| 0xa0 | Field Replacement Unit (FRU) |
| 0xb0 | PSU |
| 0x98 | Temperature Sensor |
| 0xe0 | Multiplexer (MUX) |

For example, when the bus addresses of the I²C from which the response messages are received are "0xa0 0xb0 0x36 0x66 0xa6", the processor determines the type of one device connected to these bus addresses according to Table 1 with reference to these bus addresses. In this example, the processor determines that the type of one device connected to the bus addresses of "0x36 0x66 0xa6" as a peripheral component interconnect express (PCIe) solid-state disk (SSD), and the type of another device connected to the bus addresses of "0xa0 0xb0" as a PSU. Note that in determining the type(s) of the another one(s) of the devices that is(are) connected to the bus addresses of "0xa0 0xb0", since one of the address sets consisting of a greater number of the reference addresses (e.g., two reference addresses of "0xa0 0xb0") has a higher priority of consideration, the processor determines the type of the another one of the devices connected to the bus addresses of "0xa0 0xb0" that conform respectively with the reference addresses of "0xa0 0xb0" of the one of the address sets as the device type of a PSU (see Table 1). The next two address sets that each consist of only one of the reference addresses "0xao" and "0xb0" (either the reference address "0xao" or the reference address "0xb0") will not be considered due to lower priority compared with the one address set consisting of both the reference addresses.

It should be noted that a result of the determination made in step 12 may be incorrect, and verification of the type of the at least one device is thus required.

Figure 2:
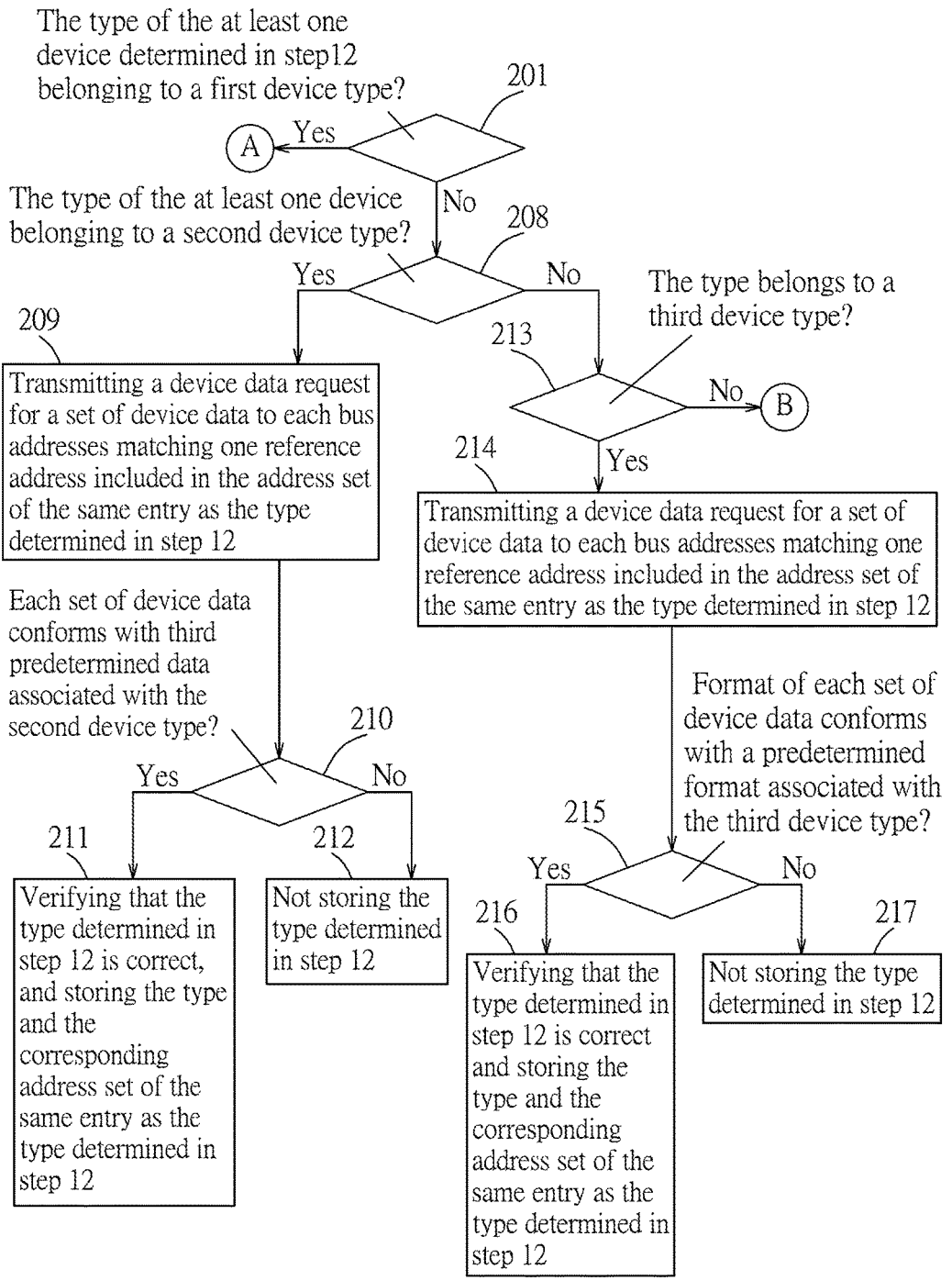
FIGS. 2 to 4 cooperatively illustrate a flow chart of a verification procedure of the method for verifying if the type of the device thus determined is correct.
Figure 3:
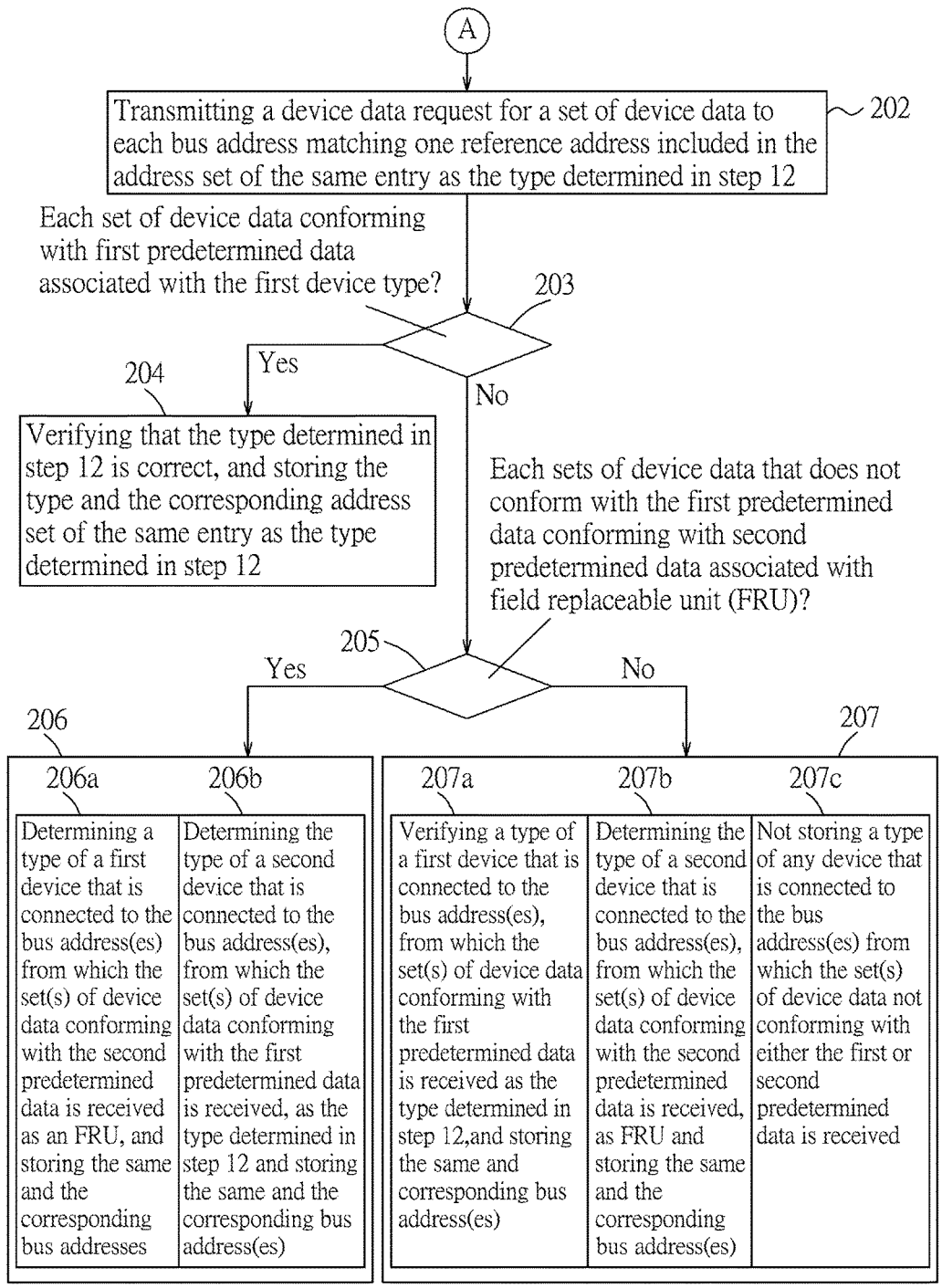
Figure 4:
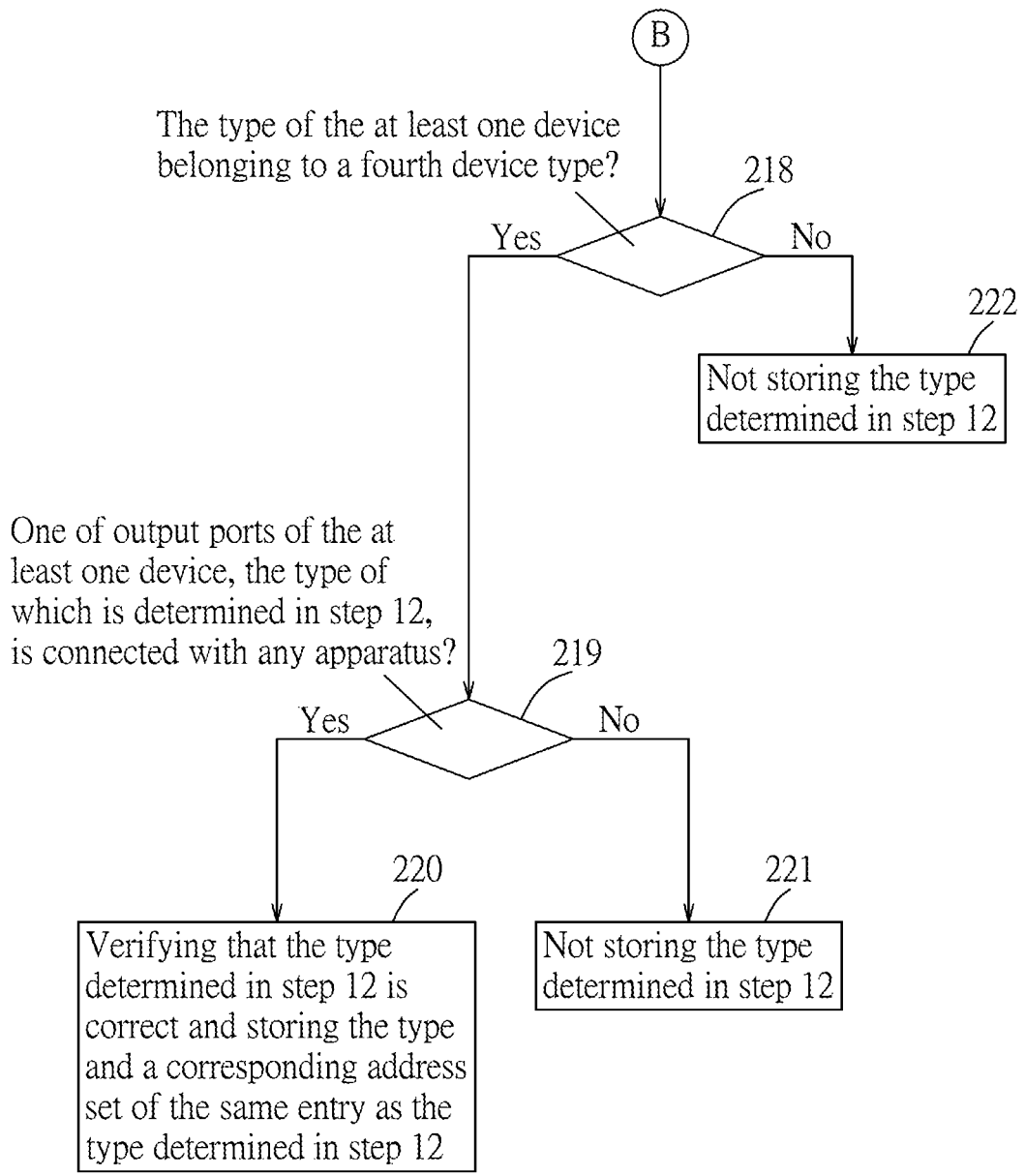

Referring to FIGS. 2 to 4, the processor implements steps of verifying the type of the at least one device determined in step 12. It should be noted that the following steps 201 to 222 are explained in an exemplified condition that a plurality of the response messages are received from respective ones of the bus addresses. For a case where plural types of the devices that are connected to the I²C are determined in step 12, the following steps 201 to 222 are performed for each of the plural types of the devices thus determined.

In step 201, the processor determines whether the type determined in step 12 belongs to a first device type. When the determination made in step 201 is affirmative, i.e., the type belongs to the first device type, the flow goes to step 202; otherwise, the flow goes to step 208. In this embodiment, the first device type includes a PSU and implementation of the first device type is not limited to this disclosure.

In step 202, the processor transmits a device data request for a set of device data to each bus address matching one reference address included in the address set of the same entry as the type determined in step 12.

Upon receipt of the set of device data from each such bus address, in step 203, the processor determines whether each set of device data conforms with first predetermined data associated with the first device type. When the determination made in step 203 is affirmative, the flow goes to 204; otherwise, the flow goes to 205. It should be noted that in step 203, the processor determines whether every single set of device data thus received conforms with the first predetermined data to verify if the type determined in step 12 is correct. When any set of device data does not conform with the first predetermined data, the determination of step 203 is negative. In step 204, the processor verifies that the type determined in step 12 is correct and stores, in a device mapping table, the type and the corresponding address set of the same entry as the type determined in step 12. The device mapping table is contained in a storage unit (not shown) electrically connected to the processor. In step 205, the processor determines whether each (and every single one) set of device data that does not conform with the first predetermined data conforms with second predetermined data associated with, for example, field replaceable unit (FRU). When the determination made in step 205 is affirmative, the flow goes to steps 206a and 206b; otherwise the flow goes to steps 207a, 207b and 207c. That is to say, the set(s) of device data that does not conform with the first predetermined data are compared with the second predetermined data in step 206.

In step 206a, the processor determines a type of a first device that is connected to the bus address(es) from which the set(s) of device data conforming with the second predetermined data is received as FRU, and stores, in the device mapping table, FRU as the type of the first device and the corresponding bus address(es). In step 206b, the processor determines a type of a second device that is connected to the bus address(es), from which the set(s) of device data conforming with the first predetermined data is received, as the type determined in step 12, and stores the same and the corresponding bus address(es) in the device mapping table. That is to say, the first device connected to the bus address(es), from which the set(s) of device data conforming with the second predetermined data is received, is verified as belonging to FRU device type whereas the second device connected to the bus address(es), from which the set(s) of device data conforming with the first predetermined data is received, is verified as belonging to the device type determined in step 12.

In step 207a, the processor verifies a type of a first device that is connected to the bus address(es), from which the set(s) of device data conforming with the first predetermined data is received as the type determined in step 12 (i.e., the first device type), and stores the same and corresponding bus address(es) in the device mapping table. In step 207b, the processor determines a type of a second device that is connected to the bus address(es), from which the set(s) of device data conforming with the second predetermined data is received, as FRU, and stores, in the device mapping table, "FRU" as the type of the second device and the corresponding bus address(es). In step 207c, the processor does not store a type of any device that is connected to the bus address(es) from which the set(s) of device data not conforming with either the first or second predetermined data is received. That is to say, in a scenario that a device which belongs to neither the first device type nor the FRU device type, the processor does not store a type of this device that is connected to the bus address(es) from which the set(s) of device data not conforming with either the first or second predetermined data is received.

Referring back to the previous example, the processor determines that the type of the device connected to the bus addresses of "0x36, 0x66, 0xa6" as a PCIe SSD, and the type of the device connected to the bus addresses of "0xa0, 0xb0" as a PSU. Generally, it is more likely that the type of the device connected to the bus addresses of "0xa0, 0xb0" belongs to a PSU. However, there is a possibility that the type of the device connected to the bus address of "0xa0" is actually an FRU whereas the type of the device connected to the bus address of "0xb0" is a PSU. Therefore, the aforementioned steps 202 to 207c may be utilized to verify if the type of the device connected to the bus addresses of "0xa0, 0xb0" actually belongs the device type of a PSU as determined in step 12.

When it is determined in step 201 that the type determined in step 12 does not belong to the first device type, the flow goes to step 208, where the processor determines whether the type belongs to a second device type. When the determination made in step 208 is affirmative, the flow goes to 209; otherwise, the flow goes to step 213. In this embodiment, the second device type includes at least one of PCIe, SSD or FRU, and the disclosure is not limited in this aspect.

In step 209, the processor transmits a device data request for a set of device data to each bus address matching one reference address included in the address set of the same entry as the type determined in step 12. Upon receipt of the set of device data from each such bus address, in step 210, the processor determines whether each set of device data conforms with third predetermined data associated with the second device type. When the determination made in step 210 is affirmative, the flow goes to step 211; otherwise, the flow goes to step 212. It should be noted that in step 210, the processor determines whether every single set of device data thus received conforms with the third predetermined data to verify if the type determined in step 12 is correct. When any set of device data does not conform with the third predetermined data, the determination of step 210 is negative.

In step 211, the processor verifies that the type determined in step 12 is correct, and stores, in the device mapping table, the type and the corresponding address set of the same entry as the type determined in step 12. In step 212, the processor does not store the type determined in step 12.

When the determination made in step 208 is negative, i.e., the type determined in step 12 does not belong to the second device type, the flow goes to step 213. In step 213, the processor determines whether the type belongs to a third device type. When the determination made in step 213 is affirmative, the flow goes to 214; otherwise, the flow goes to step 218. In this embodiment, the third device type includes temperature sensing unit, and the disclosure is not limited in this aspect.

In step 214, the processor transmits a device data request for a set of device data to each bus address matching one reference address included in the address set of the same entry as the type determined in step 12. Upon receipt of the set of device data from each such bus address, in step 215, the processor determines whether a format of each set of device data conforms with a predetermined format associated with the third device type. When the determination made in step 215 is affirmative, the flow goes to 216; otherwise, the flow goes to step 217. It should be noted that in step 215, the processor determines whether the format of every single set of device data thus received conforms with the format associated with the third device type to verify if the type determined in step 12 is correct.

In step 216, the processor verifies that the type determined in step 12 is correct, and stores, in the device mapping table, the type and the corresponding address set of the same entry as the type determined in step 12. In step 217, the processor does not store the type determined in step 12. That is to say, the processor verifies if the type determined in step 12 is correct by determining whether a format of each set of device data conforms with the predetermined format associated with the third device type. When it is determined that the format of each set of device data conforms with the predetermined format associated with the third device type, the type determined in step 12 is verified to be correct and is stored in the device mapping table. On the other hand, when it is determined that the format of each set of device data does not conform with the predetermined format associated with the third device type, the type determined in step 12 is not correct and is thus not stored in the device mapping table.

When the processor determines, in step 213, that the type does not belong to the third device type, in the flow goes to step 218, where the processor determines whether the type belongs to a fourth device type. When the determination made in step 218 is affirmative, the flow goes to 219; otherwise, the flow goes to step 222. In this embodiment, the fourth device type includes multiplexer (MUX), and the disclosure is not limited in this aspect.

In step 219, the processor determines whether one of output ports of the device, the type of which is determined in step 12, is connected with any apparatus. When the determination made in step 219 is affirmative, the flow goes to step 220; otherwise, the flow goes to step 221. It should be noted that the processor determines whether one of the output ports of the device is connected with any apparatus so as to verify if the type determined in step 12 is correct.

In step 220, the processor verifies that the type determined in step 12 is correct, and stores, in the device mapping table, the type and a corresponding address set of the same entry as the type determined in step 12. In step 221, the processor does not store the type of the at least one device determined in step 12 in the device mapping table. In step 222, the processor does not store the type determined in step 12 in the device mapping table.

To sum up, in the present disclosure, the processor transmits a plurality of requests to the bus addresses of the I²C and determines the type of any device connected to the I²C without referring to a circuit diagram that indicates what devices are connected to the bus addresses of the I²C and without the requirement of knowing in advance the bus address to which said any device is connected (e.g., a slave address of an I²C device). Further, since the IPMI command included in each request does not include an instruction set for the device corresponding to the one of the bus addresses, understanding of an instruction set for the device corresponding to the one of bus addresses of the I²C and the circuit diagram are not of necessity in advance of transmitting the request to the bus address. By this way, the type of any device connected to the bus addresses of the I²C is not limited to the configuration illustrated in the circuit diagram and may be modified with a relatively high flexibility.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for determining a type of a device connected to an inter-integrated circuit (I²C), the method to be implemented by a processor electrically connected to the I²C, the method comprising steps of:
   a) transmitting a plurality of requests to all of a plurality of bus addresses of the I²C, respectively, wherein each of the requests includes an intelligent platform management interface (IPMI) command, wherein the IPMI command of each of the requests includes a type of a read/write command, one of the bus addresses which receives the request, and a feedback request, and is free from an instruction set for a device connected to said one of the bus addresses which receives the request;
   b) upon receipt of a response message that is 1 byte of data from one of the bus addresses of the I²C, determining that at least one device is currently connected to the I²C, the response message being transmitted by the at least one device in response to receiving one of the requests from said one of the bus addresses to which the at least one device is connected; and
   c) according to a lookup table that includes a plurality of entries, each of which has a corresponding device type and a respective address set consisting of at least one reference address that conforms with one of the bus addresses of the I²C, determining a type of the at least one device as one of the device types in the lookup table with reference to said one of the bus addresses.

2. The method of claim 1, wherein step c) includes determining the type of the at least one device as the device type of one of the entries that includes the address set which only includes the reference address conforming with said one of the bus addresses from which the response message is received.

3. The method of claim 1, wherein the lookup table includes a plurality of reference addresses conforming respectively with the bus addresses of the I²C,
   wherein, in step c), the device type of one of the entries, the address set of which consists of a greater number of the reference addresses has a higher priority of consideration in the determination of the type of the at least one device.

4. The method of claim 3, wherein, when a plurality of the response messages are received from respective ones of the bus addresses in step b), step c) includes sub-steps of:

c1) determining whether each of the reference addresses included in the address set of a first one of the entries, the address set of which consists of the greatest number of the reference addresses, conforms with one of the bus addresses from which the response messages have been received, by comparing each of these bus addresses with the reference addresses included in the address set of the first one of the entries; and c2) when the determination made in sub-step c1) is affirmative, determining the type of the at least one device connected to the bus addresses that conform respectively with the reference addresses of the first one of the address sets as the device type corresponding to the first one of the entries.

5. The method of claim 4, wherein step c) further includes sub-steps of:

c3) when the determination made in sub-step c1) is negative, determining whether each of the reference address(es) included in the address set of a next one of the entries with a next priority conforms with one of the bus addresses from which the response messages have been received, by comparing each of these bus addresses with the reference address(es) included in the address set included in the next one of the entries;

c4) when the determination made in sub-step c3) is affirmative, determining the type of the at least one device connected to the bus address(es) conforming with the reference address(es) of the address set of the next one of the entries as the device type corresponding to the next one of the entries; and c5) when the determination made in sub-step c3) is negative, repeating sub-steps c3) and c4).

6. The method of claim 1, wherein, when a plurality of the response messages are received from respective ones of the bus addresses in step b), the method further comprises, after step c), steps of:

d) determining whether the type determined in step c) belongs to a device type of power supply unit (PSU);

e) when it is determined in step d) that the type determined in step c) belongs to the device type of PSU, transmitting a device data request for a set of device data to each of the bus addresses matching one reference address included in the address set of the same entry as the type determined in step c);

f) upon receipt of the set(s) of device data from the bus address(es), determining whether each of the set(s) of device data conforms with first predetermined data associated with the device type of PSU; and g) when the determination made in step f) is affirmative, verifying that the type determined in step c) is correct.

7. The method as claimed in claim 6, further comprising steps of:

h) when the determination made in step f) is negative, determining whether each of the set(s) of device data that does not conform with the first predetermined data conforms with second predetermined data associated with field replaceable unit (FRU); and i) when the determination made in step h) is affirmative, a type of a first device that is connected to the bus address(es) from which the set(s) of device data conforming with the second predetermined data is received is determined to be FRU.

8. The method as claimed in claim 7, further comprising, after step i), a step of:

determining a type of a second device that is connected to the bus address(es) from which the set(s) of device data conforming with the first predetermined data is received as the type determined in step c).

9. The method as claimed in claim 1, when a plurality of the response messages are received from respective ones of the bus addresses in step b), the method further comprises, after step c), steps of:

j) determining whether the type determined in step c) belongs to a device type including at least one of peripheral component interconnect express (PCIe) solid-state disk (SSD) or field replaceable unit (FRU);

k) when it is determined in step j) that the type determined in step c) belongs to the device type of PCIe, SSD or FRU, transmitting a device data request for a set of device data to each of the bus addresses matching one reference address included in the address set of the same entry as the type determined in step c);

l) upon receipt of the set(s) of device data from the bus address(es), determining whether each of the set(s) of device data conforms with third predetermined data associated with the device type of PCIe, SSD or FRU; and m) when the determination made in step l) is affirmative, verifying that the type determined in step c) is correct.

10. The method as claimed in claim 1, when a plurality of the response messages are received from respective ones of the bus addresses in step b), the method further comprises, after step c), steps of:

n) determining whether the type determined in step c) belongs to a device type of temperature sensing unit;

o) when it is determined in step n) that the type determined in step c) belongs to the device type of temperature sensing unit, transmitting a device data request for a set of device data to each of the bus addresses matching one reference address included in the address set of the same entry as the type determined in step c); and p) upon receipt of the set(s) of device data from the bus address(es), determining whether a format of each of the set(s) of device data conforms with a predetermined format associated with the device type of temperature sensing unit, q) when the determination made in step p) is affirmative, verifying that the type determined in step c) is correct.

11. The method as claimed in claim 1, wherein, when a plurality of the response messages are received from respective ones of the bus addresses in step b), the method further comprises, after step c), steps of:

r) determining whether the type determined in step c) belongs to a device type of multiplexer (MUX);

s) when it is determined in step r) that the type determined in step c) belongs to the device type of MUX, determining whether one of output ports of the device, the type of which is determined in step c), is connected with any apparatus; and t) when the determination made in step s) is affirmative, verifying that the type determined in step c) is correct.

12. A method for determining a type of a device connected to an inter-integrated circuit ($I^2C$), the method to be implemented by a processor electrically connected to the $I^2C$, the method comprising steps of:

a) transmitting a plurality of requests to a plurality of bus addresses of the $I^2C$, respectively, wherein each of the requests includes an intelligent platform management interface (IPMI) command, wherein the IPMI command of each of the requests includes a type of a read/write command, one of the bus addresses which receives the request, and a feedback request, and is free from an instruction set for a device connected to the one of the bus addresses which receives the request; and b) upon receipt of a response message from one of the bus addresses of the $I^2C$, determining that at least one device is currently connected to the $I^2C$, the response message being transmitted by the at least one device in response to receiving one of the requests from the one of the bus addresses to which the at least one device is connected; and c) according to a lookup table that includes a plurality of entries, each of which has a corresponding device type and a respective address set consisting of at least one reference address that conforms with one of the bus addresses of the I2C, determining a type of the at least one device as one of the device types in the lookup table with reference to the one of the bus addresses.

* * * * *